No. 723,758. PATENTED MAR. 24, 1903.
R. SYMMONDS, Jr.
POWER TRANSMITTING MECHANISM FOR MOTOR VEHICLES.
APPLICATION FILED JAN. 13, 1902.
NO MODEL. 3 SHEETS—SHEET 1.
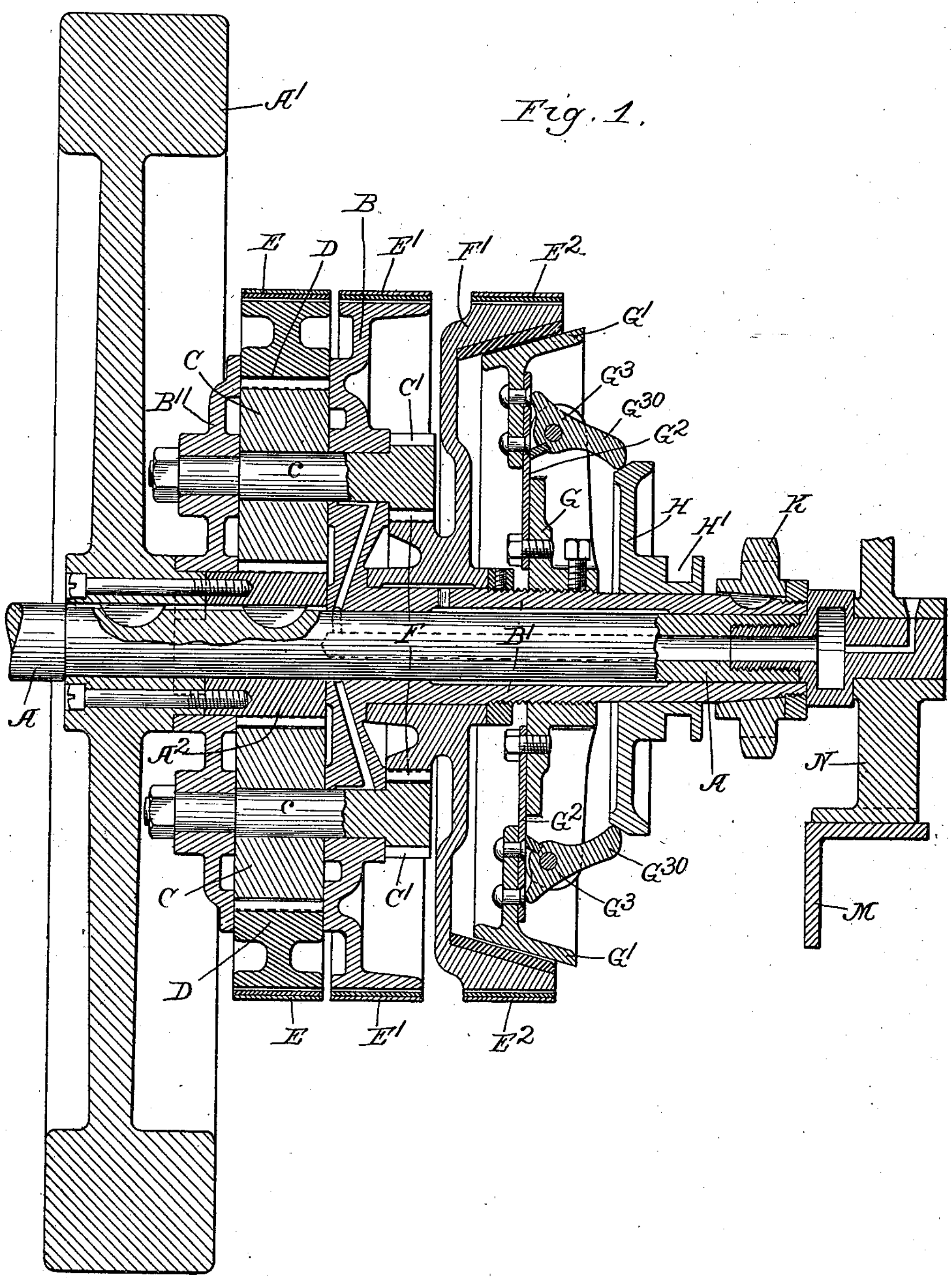
Witnesses.
Edward T. Wray.
J. W. Westerland.
Inventor.
Robert Symmonds, Jr.
by Burton & Burton his Atty's.
THE NORRIS PETERS CO., PHOTO-LITHO., WASHINGTON, D. C.

No. 723,758. PATENTED MAR. 24, 1903.
R. SYMMONDS, JR.
POWER TRANSMITTING MECHANISM FOR MOTOR VEHICLES.
APPLICATION FILED JAN. 13, 1902.
NO MODEL. 3 SHEETS—SHEET 2.
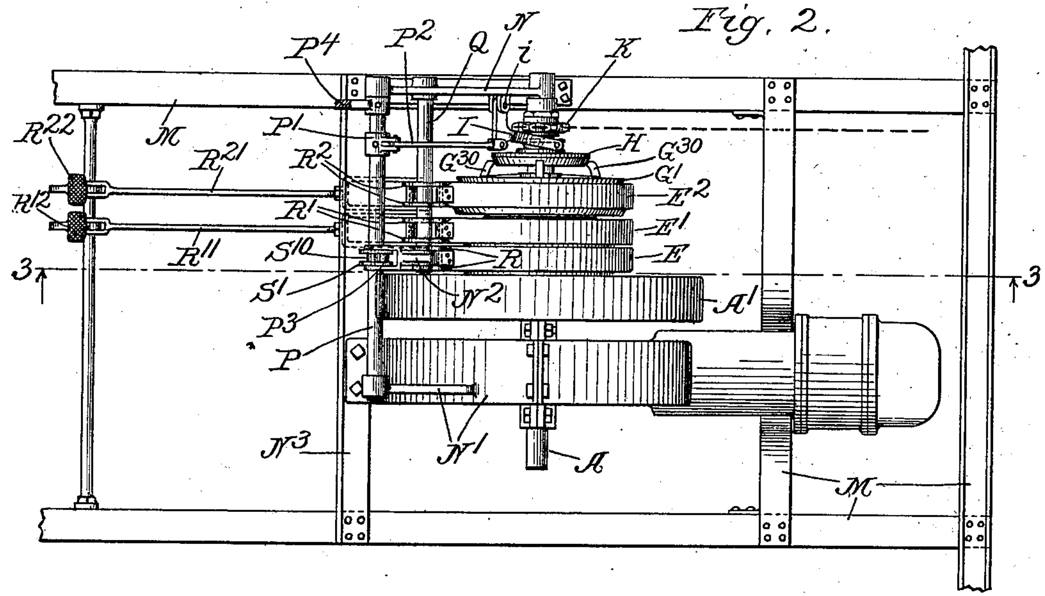
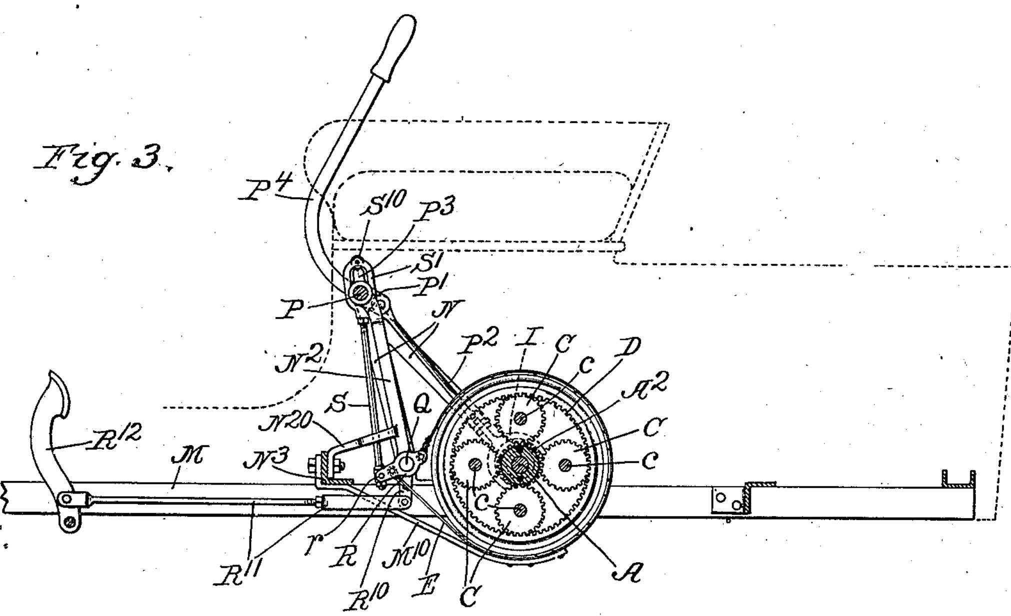
Witnesses.
Edward T. Wray
J. W. Westerland.
Inventor.
Robert Symmonds, Jr
by Burton & Burton
his Attys.
THE NORRIS PETERS CO., PHOTO-LITHO., WASHINGTON, D. C.

No. 723,758. PATENTED MAR. 24, 1903.
R. SYMMONDS, Jr.
POWER TRANSMITTING MECHANISM FOR MOTOR VEHICLES.
APPLICATION FILED JAN. 13, 1902.
NO MODEL. 3 SHEETS—SHEET 3.
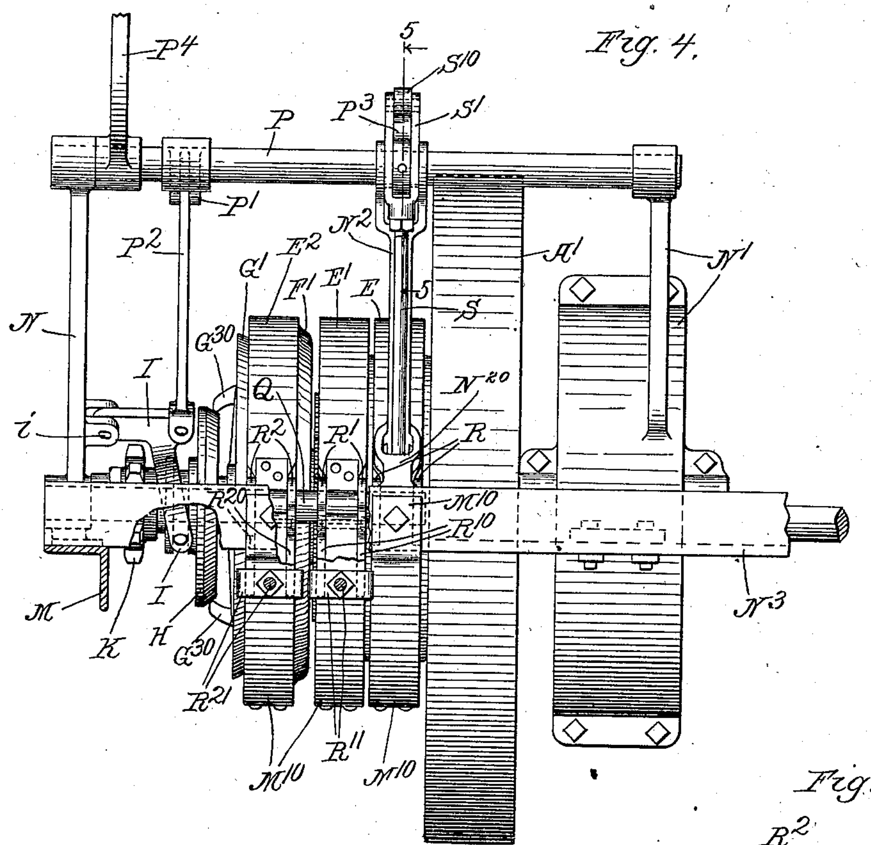
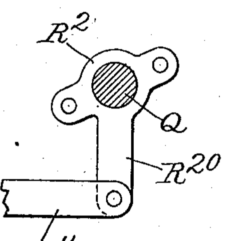
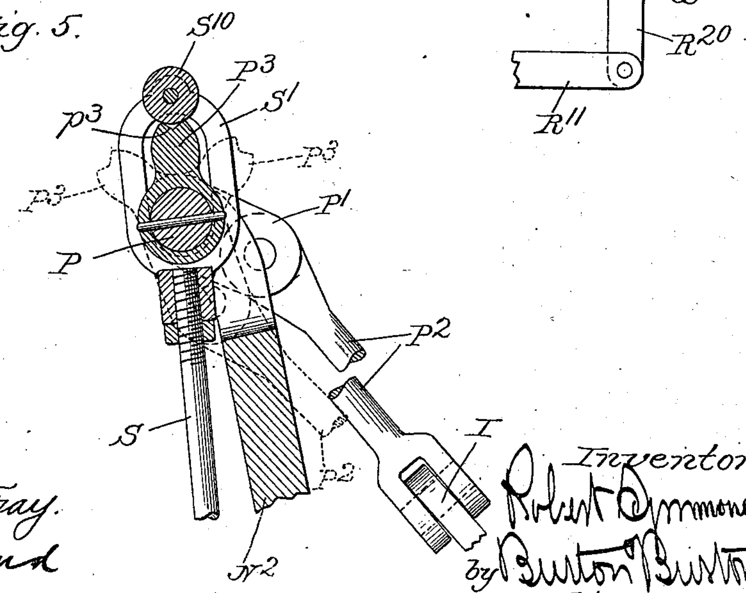
Witnesses,
Edward T. Wray.
M. Westerland
Inventor
Robert Symmonds Jr
by Burton & Burton
his Atty's.
THE NORRIS PETERS CO., PHOTO-LITHO., WASHINGTON, D. C.

UNITED STATES PATENT OFFICE.

ROBERT SYMMONDS, JR., OF KENOSHA, WISCONSIN, ASSIGNOR TO THOMAS B. JEFFERY, OF KENOSHA, WISCONSIN.

POWER-TRANSMITTING MECHANISM FOR MOTOR-VEHICLES.

SPECIFICATION forming part of Letters Patent No. 723,758, dated March 24, 1903.

Application filed January 13, 1902. Serial No. 89,510. (No model.)

*To all whom it may concern:*

Be it known that I, ROBERT SYMMONDS, Jr., a citizen of the United States, and a resident of Kenosha, in the county of Kenosha and State of Wisconsin, have invented certain new and useful Improvements in Power-Transmitting Mechanism for Motor-Vehicles, of which the following is a specification, reference being had to the accompanying drawings, forming a part thereof.

This invention is an improvement in power-transmitting mechanism especially designed and adapted for use in transmitting power from a motor to the carrier-wheels of a vehicle.

It consists in the mode of construction and operation which is set out in the claims.

In the drawings, Figure 1 is a section axially through the shaft from which the movement is derived. Fig. 2 is a plan view of the same with the portion of the frame in which it is mounted and connections for operating by hand and foot. Fig. 3 is a side elevation of the matters shown in Fig. 2. Fig. 4 is a detail elevation of the clutch and brake operating connections. Fig. 5 is a detail section at the line 5 5 on Fig. 4. Fig. 6 is a detail section through a rock-shaft, showing a lever-arm connection from one of the pedal-levers.

A is the shaft, which is journaled on the frame which supports the mechanism, and which may be of any suitable form, the specific form herein illustrated being hereinafter sufficiently described. This shaft is driven by the motor in any convenient manner. (Not illustrated.) It may carry the fly-wheel A′, rigid with it, and there is a pinion $A^2$, also made rigid with the shaft, as by being secured to the fly-wheel, the hubs of the two wheels being interlocking and connected by bolts, as illustrated. A planet-gear-carrying disk or wheel B is loose on the shaft A adjacent to the pinion $A^2$ and has a sleeve-hub B′ extending off from the side opposite the pinion, longitudinally stopped on the shaft A at the end remote from the pinion. On the opposite side of the plane of the pinion $A^2$ an annular plate B″ is journaled about the shaft A—as, for example, on the hubs of the pinion and fly-wheel—and four short shafts *c c c c*, journaled in the planet-gear-carrying disk B and in the plate B″ and connecting these two elements, have fast on them between the latter planet-gears C C C C, which mesh with the central pinion $A^2$ and also with the annular internal gear D, which encompasses the system of planet-gears C C C C and is encompassed by the brake-strap E. The shafts *c c c c* have at the side of the disk B′ opposite the planet-gears C C C C smaller gears C′ C′ C′ C′, which all mesh with the gear F, formed rigid with the outer or hollow cone member F′ of a friction-clutch. Said outer clutch member is journaled on the sleeve-hub B′ of the planet-gear carrier, and the latter has adjustably rigid with it at the open side of the said hollow cone member F′ the inner member of said friction-clutch. Said inner clutch member comprises the spider G, provided with spring-spokes $G^2$ $G^2$, &c., secured to the annular conical clutch-rim G′, having its outer conical surface mating the inner conical surface of the outer member F′. On the arms of the spider are pivoted cam-levers $G^3$ $G^3$, whose longer arms $G^{30}$ trend shaftward and rest on the periphery of a cam-disk H, which is loose on the sleeve B′ and has a range of sliding movement longitudinally on said sleeve between the hub of the inner clutch member F and the hub of the sprocket-pinion K, which is fast on the sleeve at the outer end of the latter. The shorter arms of the levers $G^3$ bear against the outer end portion of the spring-spokes or substantially against the back of the inner clutch member G′ in such relation thereto as to crowd such member into frictional engagement with the outer member when the cam-disk H is moved on the sleeve toward the clutch. The hub of the cam-disk is peripherally grooved at H′ to receive the fork-arms of a shipping-lever I, arranged, as hereinafter described, for actuating said cam-disk laterally to engage and disengage the clutch. The peripheries of the annular interior gear D of the planet-gear-carrying disk B and of the outer clutch member F′ are encompassed by brake-straps E, E′, and $E^2$, respectively, which are operated by rockers loose on a shaft Q. The construction of the frame for supporting this shaft and others may be substantially as illustrated.

Angle-iron frame-bars supporting the machine are seen at M M, and on this frame are mounted opposite standards N and N′, in which are journaled opposite ends of the shaft A. Parallel with said shaft A are rock-shafts P and Q, the former located close under the operator's seat and the latter in the horizontal plane of the shaft A, so near to the latter that the fly-wheel A′ prevents it from reaching the outer standard N′. Hence to afford it a second bearing in addition to the standard N a hanger $N^2$ is provided, depending from the shaft P and having a brace-arm $N^{20}$ extending to the cross-bar $N^3$ of the frame. From said cross-bar $N^3$ are extended rigidly the brake-strap-carrying arms $M^{10}$ $M^{10}$ $M^{10}$. On the shaft Q are loosely mounted the clamping-rockers R R′ $R^2$, connected to the brake-straps E E′ $E^2$, respectively.

The shaft P has a rigid lever-arm or crank P′, which is connected by a link $P^2$ to the shipping-lever I, which is pivoted at *i* on the standard N, so that the rocking shaft P may operate said shipping-lever, as heretofore described. On the shaft P there is a cam $P^3$, which is encompassed by a yoke S′, which terminates at the upper end in a link S, whose lower end is pivotally connected to the lever-arm *r* of the rocker R, which operates the brake-strap E on the periphery of the internal gear D. The rocker R′, which operates the brake-strap E′ on the periphery of the pinion-carrier B, has a lever-arm $R^{10}$, extending downward and connected by a link $R^{11}$ to a pedal-lever $R^{12}$, suitably fulcrumed on the frame forward of and below the level of the seat. The rocker $R^2$, which operates the brake-strap $E^2$ on the outer clutch member F′, is similarly constructed, being provided with a lever-arm $R^{20}$, link $R^{21}$, and pedal-lever $R^{22}$. The yoke S′, encompassing the cam $P^3$ on the shaft P, has an elongated eye for said shaft and at the upper end an antifriction-roll $S^{10}$ in the plane of the cam $P^3$. The end of the cam remote from the shaft has a recess or notch $p^3$, forming a seat for the roll $S^{10}$. The shaft P has a handle-lever $P^4$, and the relative position of the lever-arm P and the cam $P^3$ are such that as the shaft P is rocked from the position in which the cam appears in dotted line at the right of the yoke in Fig. 5 to the position at which the roll is seated in the notch $p^3$ the lever-arm P′, which operates the shipping-lever I, is passing through an arc carrying its pivotal connection with the link $P^2$ from one side to the other of the direct line from the axis of the shaft P to the pivotal connection of the link to the shipping-lever—that is, past the center—so that in this movement the shipping-lever is swung so as to move the cam-disk H first a little outward and then a little inward with respect to the clutch, the position at the beginning and end and throughout so much of the movement being such as not to engage the clutch members. At the position at which the roll $S^{10}$ is seated in the upper end of the cam $P^3$ and the latter stands directly upward from the shaft P it will be seen that the link S is drawn upward to the limit and the rocker R is operated to tighten the brake-strap E. This condition (the clutch disengaged and the internal-gear ring D held stationary) causes the rotation of the shaft A to communicate, by means of the pinion $A^2$, to the planet-gears C C C C rotation about the axis, causing them to rotate the pinion-carrier B about the shaft A with a reduced speed, due to the relation of the pinions $A^2$ and C and internal gear D, and the sprocket K is thereby caused to communicate slow speed to the carrying-wheels of the vehicle. If the handle-lever $P^4$ of the shaft P is now thrown over forward, so as to carry the cam $P^3$ to the dotted-line position shown at the left in Fig. 5, the brake-strap E is released and the clutch is engaged. This condition causes the entire transmitting-train from shaft A to sprocket-wheel K to revolve as integral with the speed of the shaft A, which is the highest speed attainable. If the handle $P^4$ is thrown back to bring the cam $P^3$ into the position shown in dotted line at the right in Fig. 5, the brake-strap E is released, and the clutch is also released, and the rotation of the shaft A will communicate to the pinion K only such motion as may be transmitted by the excess of friction at one part or another, and if under these conditions the pedal $R^{12}$ is operated to rock the rocker R′ in position to clamp the brake-strap E′ on the periphery of the gear-carrying disk B, that disk being held stationary, all motion which might be transmitted by the friction of the train from the shaft A to the sprocket-pinion K will be prevented, and the train will revolve idly within itself without transmitting any motion to said sprocket-pinion and the vehicle will not be driven by the motor.

I claim—

1. A power-transmitting train comprising a shaft from which motion is derived; a pinion rigid therewith; a planet-gear carrier, and a loose clutch member having a gear rigid with it; said planet-gear and the loose clutch member being independently rotative about the shaft; two planet-gears rigidly connected, journaled on the gear-carrier, one meshing with the shaft-pinion and the other with the clutch-gear; a companion clutch member rigid with the planet-gear carrier; and means for engaging and disengaging the clutch members at will.

2. A power-transmitting train comprising a shaft from which motion is derived; a pinion rigid therewith; a planet-gear carrier and a loose clutch member provided with a gear, said gear-carrier and said clutch member being independently rotative about the shaft; two planet-gears rigidly connected, journaled on the gear-carrier, one meshing with the shaft-pinion and the other with the clutch-gear; an internal gear or annular rack mounted concentrically on the shaft and meshed with one of the two rigid planet-gears; a companion clutch member rigid with the planet-gear carrier; means for engaging and disengaging the clutch members, and means for restraining the rotation of the internal gear or rack.

3. A power-transmitting train comprising a shaft from which motion is derived; a part to be driven for doing the work; a pinion on the shaft; a planet-gear carrier rigid with said driven part; two planet-gears rigidly connected journaled on the gear-carrier; an internal gear or annular rack and an external gear, both independently rotative about the shaft, one of the planet-gears meshing with the shaft-pinion and with the internal gear, and the other meshing with the external gear; and independent means for restraining the rotation of said two gears last mentioned, and further independent means for restraining the rotation of the planet-gear carrier.

4. A power-transmitting train comprising a shaft from which motion is derived; a pinion rigid thereon; a part which is to be driven for doing the work; a planet-gear carrier rigid with said driven part, and a clutch member provided with a gear, both the gear-carrier and the clutch member being independently rotative about the shaft; two planet-gears rigidly connected, journaled on the gear-carrier, one meshing with the shaft-pinion and the other with the clutch-gear; an internal gear or annular rack mounted concentrically with the shaft meshed with one of the planet-gears; a companion clutch member rigid with the planet-gear carrier; means for engaging the two clutch members and means for restraining the rotation of the internal gear or rack, said means being adapted to cause the rack to be arrested only when the clutch is to be disengaged.

5. A power-transmitting train, comprising a shaft from which motion is derived; a part to be driven for doing the work; a pinion on the shaft; a planet-gear carrier rigid with the driven part; two planet-gears rigidly united journaled on the gear-carrier; an internal gear or annular rack, and an external gear and clutch member rigid therewith, said annular gear, gear-carrier and clutch member being independently rotative about the shaft; a companion clutch member fast on the gear-carrier; and means adapted to be operated at will for engaging and disengaging the clutch members and for restraining the rotation of said three independently-rotative parts respectively.

6. A power-transmitting train, comprising a shaft from which motion is derived; a pinion rigid therewith; a part which is to be driven for doing the work; a planet-gear carrier rigid with said driven part; a clutch member provided with a gear, both the gear-carrier and the clutch member being independently rotative about the shaft; two planet-gears rigidly connected journaled on the gear-carrier, one meshing with the shaft-pinion and the other with the clutch-gear; an internel gear or annular rack mounted concentrically with the shaft meshed with one of the planet-gears; a brake device for restraining the rotation of said rack; a companion clutch member attached so as to rotate with the gear-carrier; a member movable longitudinally on the shaft, and connections by which such movement engages and disengages the clutch members; a shipping member for moving said member fulcrumed on the frame; a rock-shaft, and means for operating it at will; lever projections therefrom for operating respectively the shipping-lever and the brake on the annular rack, said projections being in such relation about the rock-shaft as to cause the brake to be released when the clutch is engaged.

In testimony whereof I have hereunto set my hand, in the presence of two witnesses, at Kenosha, Wisconsin, this 10th day of January, A. D. 1902.

ROBERT SYMMONDS, Jr.

In presence of—

James Baley,

John F. Kitzron.